(12) United States Patent
Trestman et al.

(10) Patent No.: US 6,181,076 B1
(45) Date of Patent: Jan. 30, 2001

(54) APPARATUS AND METHOD FOR OPERATING A HIGH INTENSITY GAS DISCHARGE LAMP BALLAST

(75) Inventors: Grigoriy A. Trestman, Salem; David L. Bay, Danvers, both of MA (US)

(73) Assignee: Osram Sylvania Inc., Danvers, MA (US)

( * ) Notice: Under 35 U.S.C. 154(b), the term of this patent shall be extended for 0 days.

(21) Appl. No.: 09/377,471

(22) Filed: Aug. 19, 1999

(51) Int. Cl.$^7$ .................................................. H05B 37/02
(52) U.S. Cl. ........................ 315/224; 315/291; 315/219
(58) Field of Search .................................. 315/219, 307, 315/291, 224, 226, DIG. 7, 209 R, 212

(56) References Cited

U.S. PATENT DOCUMENTS

| | | | |
|---|---|---|---|
| 4,415,839 | 11/1983 | Lesea | 315/308 |
| 4,904,904 | * 2/1990 | Zarate | 315/219 |
| 5,192,897 | * 3/1993 | Vossough et al. | 315/308 |
| 5,426,239 | * 6/1995 | Nilssen | 315/219 |
| 5,623,187 | 4/1997 | Caldeira et al. | 315/307 |
| 5,719,474 | 2/1998 | Vitello | 315/307 |
| 5,796,216 | * 8/1998 | Beasley | 315/307 |
| 5,850,127 | 12/1998 | Zhu et al. | 315/307 |
| 5,877,592 | * 3/1999 | Hesterman et al. | 315/306 |
| 5,933,340 | * 8/1999 | Adamson | 363/97 |
| 6,088,249 | * 7/2000 | Adamson | 363/97 |
| 6,094,017 | * 7/2000 | Adamson | 315/307 |

OTHER PUBLICATIONS

"Development of the Versatile Electronic Ballast for Metal Halide Lamps with Phase–Shift Soft–Switching Control", Tsay et al, pp. 2112–2119, 1996.
"Phase Shift Resonant Controller", Unitrode Product Data Handbook, p. 3–363, Apr. 1997.
"Phase Shifted, Zero Voltage Transition Design Consideration and the UC3875 PWM Controller", Unitrode Applications Handbook, pp. 3–300 to 3–313, Apr. 1997.

* cited by examiner

Primary Examiner—Don Wong
Assistant Examiner—Ephrem Alemu
(74) Attorney, Agent, or Firm—Carlo S. Bessone

(57) ABSTRACT

A method of and apparatus for operating a high intensity gas discharge lamp is provided wherein the inverter circuit operates at a controlled frequency such that deleterious effects of the lamp's acoustic resonant frequencies are minimized. The inverter utilizes a transformer output with high leakage inductance. The high leakage inductance provides low loss switching operation and simplified control of lamp current during both ignition and warm-up. High frequency operation as well as judicious component design and specification reduces component count, assembled size and cost of ballast.

11 Claims, 1 Drawing Sheet

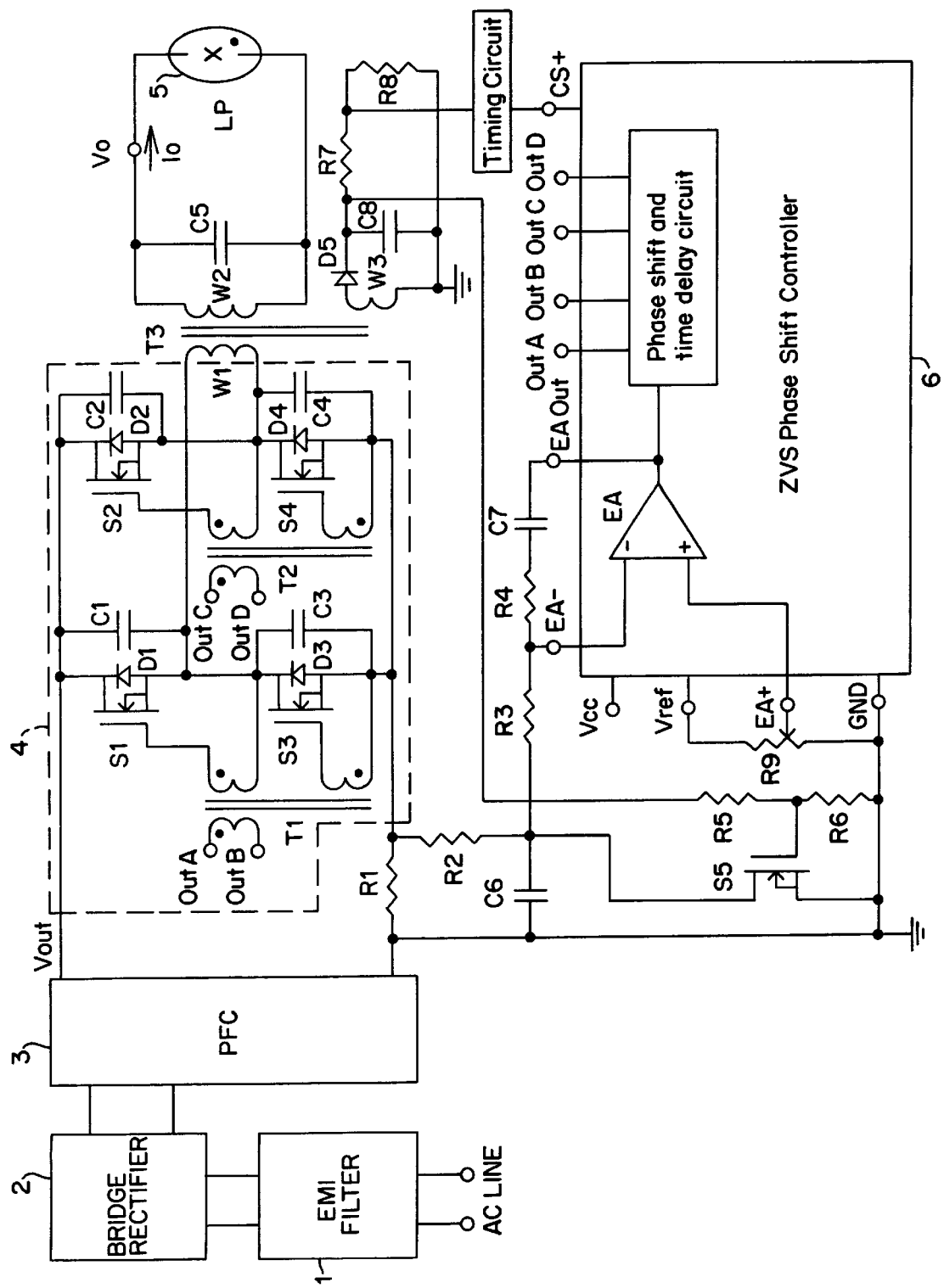

APPARATUS AND METHOD FOR OPERATING A HIGH INTENSITY GAS DISCHARGE LAMP BALLAST

TECHNICAL FIELD

The invention relates to an apparatus for and a method of providing high-frequency, constant power through an electronic ballast circuit for a high intensity discharge (HID) lamp. Specifically, an inverter circuit used to provide an AC signal to the HID lamp is operated at a frequency higher than a resonant frequency of a tank circuit.

BACKGROUND ART

Known HID lamp circuits operate in various frequency ranges. Low frequency switching ballast circuits (square wave), such as those which operate in the range of 100–200 Hz, require ignition circuits and complex constant power control. Additionally, the physical size of the components required in a low frequency implementation is restrictively large.

Middle frequency switching ballasts, such as those operating in the frequency range of 10–100 kHz with a resonant ignition, require complex control circuits for arc instability detection and frequency modulation. An example of such a circuit is described in U.S. Pat. No. 5,623,187 issued on Apr. 22, 1997 to Caldeira et al. The system described in this patent includes a complex circuit required to detect and adjust the operating frequency of the inverter circuit to avoid acoustic resonance of the discharge arc.

Other references, such as U.S. Pat. No. 5,719,474 issued on Feb. 17, 1998 to Vitello and U.S. Pat. No. 5,850,127 issued on Dec. 15, 1998 to Zhu et al. disclose lamp circuits which operate at up to 100 kHz. The circuit of Vitello requires a microprocessor to control the inverter circuit, and neither patent utilizes the leakage inductance inherent in a transformer output as a current regulating device.

U.S. Pat. No. 5,877,592 issued Mar. 2, 1999 to Hesterman et al. describes a ballast circuit which operates in the 40–50 kHz range and includes inductive elements in the lamp connections. The system relies upon a timer circuit to switch from the preheat phase, however, and does not operate in a manner in which the inverter can operate uncontrolled by its control circuit until the lamp heats up.

All of the foregoing patents describe electronic ballast circuits for lamps which operate in a frequency range of up to 100 kHz. None of the circuits operate in the range of 300 kHz, and none are designed in conjunction with a transformer output circuit with high leakage inductance and an operating frequency of the inverter which exceeds the resonant frequency of the tank circuit.

DISCLOSURE OF THE INVENTION

It is an object of the present invention to provide an improved method of and system for operating an HID lamp.

Another object of the present invention is to overcome the disadvantages of the prior art by providing an improved apparatus for and a method of providing high-frequency, constant power through an electronic ballast circuit to an HID lamp.

Yet another object of the present invention is to provide an improved system for and a method of energizing an HID lamp with high frequency electric power so as to have a fundamental electric power frequency above the highest lamp resonant acoustic frequency so as to avoid problems associated with operating at or near the lamp's acoustic resonant frequencies.

Still yet another object of the present invention is to provide an improved apparatus for and method of operating above the highest lamp acoustic resonant frequency, greatly simplifying the ballast's construction and reducing ballast cost.

A further object of the present invention is to provide an electronic lamp circuit with a transformer output with a high leakage inductance value, to provide: a) resonant boosting of output voltage during ignition phase of operation, b) inductive current limiting during warm-up and c) lossless switching of inverter during normal lamp operation.

An additional object of the present invention is to provide an improved apparatus for and method of supplying high frequency power to a lamp circuit to increase the speed of ignition and warm-up.

It is still another object of the present invention to provide all of the foregoing using a simplified circuit using smaller, reduced cost components.

This invention achieves these and other objects by providing an improved system and method useful in the operation of a HID lamp. Specifically, a HID lamp circuit includes a transformer output with high leakage inductance. An inverter circuit provides AC power through the transformer at a frequency higher than the resonant frequency of the tank circuit formed by an output capacitor and the leakage inductance of the transformer, thereby providing rapid ignition and warm-up with a simplified circuit.

BRIEF DESCRIPTION OF THE DRAWING

This invention may be clearly understood by reference to the attached drawing, which is a schematic circuit representation of an embodiment of the present invention.

MODE FOR CARRYING OUT THE INVENTION

For a better understanding of the present invention, together with other and further objects, advantages and capabilities thereof, reference is made to the following disclosure and appended claims taken in conjunction with the above-described drawing.

The drawing illustrates a circuit designed to ignite an HID lamp 5 by providing power to the lamp 5 from a power source through an inverter circuit 4 which has at least one inverter control input and transformer T3, wherein the inverter circuit 4 operates at a frequency higher than a resonant frequency of a resonant tank circuit formed by the transformer T3 and an output capacitor C5. This resonant frequency is typically 300 kHz. The transformer T3 has a first winding connected to an output of the inverter circuit. The circuit warms up the lamp by increasing a current in the lamp 5 until it reaches a predetermined normal operating voltage. A control circuit regulates power supplied to the lamp 5 during normal operation to maintain a predetermined power level. The control circuit is connected between the power source and the inverter 4 as well as to at least one inverter control input of the inverter 4. With the present invention, lamp starting time is typically 1 minute.

The HID lamp electronic ballast is powered by an AC line. The ballast controls the electrical power supplied to the gas discharge lamp 5, providing the voltage and current required to ignite, warm-up and normally operate the lamp 5. EMI Line filter 1 receives the AC line, reduces conducted interference and provides its output to bridge rectifier 2. Bridge rectifier 2 provides a rectified sinusoid output to power factor correction (PFC) converter 3. PFC converter 3 reduces line harmonic distortion and generates constant DC voltage Vout. Vout is applied to full bridge inverter 4 having transformer T3 output. One terminal of Vout passes through current sense element R1.

Inverter 4 generates an AC voltage at a fixed frequency determined by zero voltage switching (ZVS) phase shift controller 6. Phase shift controller 6 may be, for example, a Unitrode UC1875. The UC1875 family of integrated circuits implements control of the bridge power stage by phase shifting the switching of one half bridge with respect to the other, allowing constant frequency pulse-width modulation in combination with resonant, zero-voltage switching for high efficiency performance at high frequencies.

A secondary winding W2 of transformer T3 is connected to a parallel arrangement of a capacitor C5 and gas discharge lamp 5. The output transformer T3 may be constructed using E-cores with a bobbin on which the windings are separately wound.

The inverter 4 includes transformers T1 and T2, each having first, second, and third windings. The first winding of T1 is connected to output terminals Out A and Out B of phase shift controller 6. The first winding of T2 is connected to output terminals Out C and Out D of phase shift controller 6. The winding nodes to which Out A and Out C are connected are identified with a dot indicating magnetic start of the winding.

Switches S1 and S3 are arranged in series between the voltage rails of inverter 4, as are switches S2 and S4. The windings of transformers T1 and T2 are phased so that when transistors S1 and S4 are on, transistors S2 and S3 are off. The switches are shown with their corresponding body diodes D1–D4 and parasitic output capacitances C1–C4. Gates of S1 and S2 are connected to magnetic starts (dotted nodes) of the second windings of transformers T1 and T2, respectively. Gates of S3 and S4 are connected to undotted nodes of the third windings of transformers T1 and T2, respectively. Undotted nodes of the second windings of T1 and T2 are connected between S1/S3 and S2/S4, respectively. Dotted nodes of the third windings of both T1 and T2 are connected to the lower voltage rail of inverter 4. The nodes of W1 are connected between S1/S3 and S2/S4.

A sense circuit connecting inverter 4 to phase shift controller 6 includes sampling resistor R1, as well as the series arrangement of R2, R3, R4, and C7, which is connected to the EA Out pin of the phase shift controller 6. EA− of the phase shift controller 6 is connected between R3 and R4. C6 is arranged parallel to R1/R2. A variable resistor R9 is connected between Vref and GND, with the tap connected to EA+.

Within the phase shift controller 6, the voltage signal from current sense element R1 and the programmed voltage provided at EA+ by the variable resistor R9 are supplied to the control chip internal error amplifier EA for comparison. An output of the error amplifier is connected to the EA Out pin as well phase shift and time delay circuitry within the phase shift controller 6. The phase shift and time delay circuitry drives provides the signals Out A–Out D of the phase shift controller 6. The control loop keeps the inverter input constant during the normal operating phase of the lamp by adjusting Out A–Out D to control inverter 4. Due to constant voltage on the inverter input and constant efficiency, power consumption by the lamp stays approximately constant. Maximum current is achieved when the duty cycle of the signal from the phase shift and time delay circuit is 100%. A reduced duty cycle reduces the current to the load. Typical HID lamp voltage during operation is 70–100 volts.

In order to allow the output voltage of the transformer T3 to increase rapidly during ignition, an ignition circuit is required to temporarily disable the error amplifier (EA) of phase shift controller 6. FET switch S5, winding W3 of transformer T3, diode D5, storage capacitor C8 and resistive ignition phase voltage divider R5/R6 perform this function. Winding W3 is arranged in close proximity to the secondary winding W2 of transformer T3. The nodes of W3 are connected to ground and the anode of D5. Storage capacitor C8 is connected to the cathode of D5 and ground. Voltage divider R5/R6 is connected from between C8 and D5 to ground. The gate of S5 is connected between R5 and R6. S5 connects the point between R2 and R3 to ground.

To provide fault protection, additional circuitry is provided to shut down the phase shift controller 6 in the event of very high voltage. To provide this, overvoltage protection resistive voltage divider R7/R8 is arranged parallel to C8. The point between R7 and R8 is connected to pin CS+ of phase shift controller 6. A timing circuit may be placed between R7/R8 and CS+. The timing circuit may include a flip-flop.

The HID lamp has three phases of operation: ignition of discharge, warm-up and normal operation. During the various phases, the requirements for electrical energy from the ballast are different.

To break down gas in the lamp and initiate discharge, the ballast has to provide voltage in the kilovolts range during the ignition phase.

During the warm-up phase, which follows ignition, the lamp voltage is one-half to one-third the voltage at normal operation, and the ballast has to provide increased current to shorten a warm-up time.

During normal operation, the ballast should provide constant power to the lamp. This is achieved by having the voltage at the output of PFC 3 at a constant DC voltage and maintaining the current to the load at a constant level.

The present invention provides all these requirements with a minimum number of components while utilizing a simple control structure. It utilizes a Zero Voltage Switching (ZVS) phase shift controlled inverter, operating at high frequency (e.g., 320 kHz), with transformer output and indirect power control. With the inverter frequency higher than the resonant frequency of the tank circuit, the output appears as an inductive load, rather than a capacitive load. In addition to the benefits of simplicity and minimum cost, this solution provides additional benefits like isolated output and small size.

Transformer T3 is designed with excessive leakage inductance, providing an inductive component for the resonant tank circuit. During the various phases of the lamp operating cycle, the leakage inductance of the transformer performs different functions in the ballast.

The operation of the illustrated circuit will now be described, with respect to the various phases of lamp operation in the order executed following power on.

Ignition Phase

The present invention uses a resonant ignition. During the ignition phase, leakage inductance of transformer T3 forms the resonant tank with the output capacitor C5 with the resonant frequency slightly less than the operating frequency of the inverter. When the ballast starts, due to the resonant effect, the amplitude of the AC voltage on the lamp increases rapidly until electrical breakdown of the gas in the lamp occurs. The output voltage and current rapidly reach substantial values, in the range of 1–10 kV and 0.5–5 A. To allow the inverter to reach these values, the control loop must be blocked during ignition.

Diode D5 and storage capacitor C8 form a peak voltage detector. The DC voltage on the capacitor C8 is proportional to the amplitude of the AC voltage on the winding W2. This voltage is divided by voltage divider network R5/R6 and applied to the gate of FET switch S5. When the gate of S5 reaches its threshold value FET S5 turns on. FET S5 serves to block the signal from current sense resistor R1, so phase shift controller 6 provides for maximum duty cycle and does not limit resonant voltage and current. The transistor S5 remains conducting all the time when voltage on the winding W2 stays high.

In the case of a hot restart or the absence of the lamp 5 in the socket, voltage on the ballast output can reach very high values (tens of kV). This can lead to the arc-over in the socket, breakdown of transformer T3, or damage to capacitor C5. Winding W3, diode D5, capacitor C8 and resistive divider R7/R8 and the timing circuit form a fault protection circuit. When the voltage provided between R7 and R8 exceeds 2.5V, it disables the phase shift controller 6 and initiates a timing cycle in the timing circuit with a duration in the range of seconds. At the end of the timing cycle, the timing circuit enables the controller and the ignition cycle repeats. If a flip-flop is included, the phase shift controller will not restart until the power supply has been cycled.

Warm-up Phase

Immediately after ignition, the lamp voltage drops to a value approximately one-half to one-third of the normal operation voltage, increasing gradually until it reaches normal operation voltage. This phase is known as the warm-up phase of the operation cycle, and may last from tens of seconds to minutes. Because of the low output voltage, power consumption by the lamp is low and the phase shift controller 6 increases pulse width in an attempt to provide constant power. When the pulse width reaches its maximum value, the control loop cannot regulate input power and the leakage inductance of transformer T3 begins to function as a current limiting element in the circuit. The leakage inductance of the transformer is selected such that the lamp current in the absence of control by the phase shift controller 6 is 1.3–1.5 times greater than during normal steady state operation. This reduces the HID lamp warm-up time. During that time, waveforms of voltage and current have close to a triangular shape with slightly rounded tops due to the effect of capacitor C5.

At the end of the warm-up phase, the lamp voltage reaches the level where power consumption reaches a predetermined level (adjustable with potentiometer R9). The control loop then takes over and starts to regulate power supplied to the lamp.

Normal Operation Phase

When the lamp voltage reaches nominal value, the warm-up phase finishes and the steady state operation phase begins. During normal operation, controller UC1875 maintains constant power to the lamp and ensures high frequency lossless switching of the inverter. The voltage signal developed across R1 is compared to a predetermined set voltage as determined by the position of the potentiometer wiper of variable resistor R9 connected to EA+ of the phase shift controller 6.

The leakage inductance of transformer T3 during the lamp's steady state phase plays the role of an energy storage element, providing energy for recharging the parasitic drain-source capacitances C1–C4 of the inverter FETs S1–S4 and lossless switching.

During the normal operation phase, due to effect of capacitor C5, waveforms of lamp voltage and current have an approximately sinusoidal shape. This has a positive effect on system operation ( e.g., reduces EMI).

The leakage inductance also limits output current to acceptable levels in the case of a short circuit on the output. The ballast utilizes parasitic elements of the circuit such as leakage inductance of output transformer and parasitic drain-to-source capacitance of inverter MOSFETs to provide low less operation at high frequency.

The embodiment described represents just one which utilizes the invention and is set forth here by way of illustration but not of limitation. It is apparent that many other embodiments which will be readily apparent to those skilled in the art may be made without departing materially from the spirit and scope of this invention. For example, the ballast could be implemented with a lamp drive scheme which includes frequency and/or amplitude modulation or control schemes to optimize lamp operation.

What is claimed:

1. A ballast circuit for use with a high intensity discharge lamp, comprising:

a power source;

an inverter circuit receiving DC power from the power source, the inverter circuit having at least one inverter control input;

a transformer having a first winding electrically connected to an output of the inverter circuit, the transformer having a known leakage inductance;

an output capacitor electrically connected to a second winding of the transformer, the output capacitor being structured and arranged to electrically connect to a lamp; and a control circuit electrically connected between the power source and the inverter circuit, the control circuit also being electrically connected to the at least one inverter control input to regulate power supplied to the lamp;

wherein the leakage inductance is selected such that the leakage inductance of the transformer limits current to the lamp during a warm-up phase of operation.

2. The ballast circuit of claim 1, wherein the transformer and the output capacitor together form a resonant tank, and wherein the control circuit is structured and arranged to cause the inverter circuit to operate at a frequency higher than a resonant frequency of the resonant tank circuit.

3. The ballast circuit of claim 1, wherein the leakage inductance of the transformer is selected and the control circuit is structured and arranged such that the limit of current during the warm-up phase of operation is in the range of 1.3–1.5 times a current to the lamp during steady state operation phase.

4. The ballast circuit of claim 1, wherein the control circuit comprises:

a sampling resistor electrically connected between the power supply and the inverter circuit;

a phase shift controller electrically connected to the sampling resistor, the phase shift controller controlling the at least one inverter control input based on a sample voltage across the sampling resistor.

5. The ballast circuit of claim 4, wherein during the warm-up phase of operation, the sample voltage is below a predetermined threshold voltage, causing the control circuit not to limit power supplied through the inverter.

6. The ballast circuit of claim 5, wherein during the warm-up phase of operation, the leakage inductance of the transformer is the only source of current limiting to the lamp.

7. A method of operating a high intensity discharge lamp having a ballast circuit comprising a power source connected to an inverter circuit being controlled by a control circuit, a lamp and output capacitor being connected to the inverter circuit through a transformer having a known leakage inductance, said method comprising the steps of:

igniting the lamp by providing voltage to the lamp from the power source through the inverter circuit and the transformer, wherein the inverter operates at a frequency higher than a resonant frequency of a resonant tank circuit formed by the transformer and the output capacitor;

warming-up the lamp by increasing a current in the lamp until the voltage across the lamp reaches a predetermined normal operating voltage wherein during the warming-up step, current supplied to the lamp is not limited by the control circuit, and current supplied to the lamp is limited by leakage inductance of the transformer; and regulating power supplied to the lamp during steady state operation to maintain a predetermined power level.

8. The method of claim 7, wherein during the igniting step, the control circuit is disabled.

9. The method of claim 7, wherein the control circuit comprises an overvoltage detection circuit, and wherein during the igniting step, the inverter circuit is disabled if a voltage across a second winding of the transformer exceeds a predetermined voltage.

10. The method of claim 7, wherein the resonant frequency of the resonant tank circuit is approximately 300 kHz.

11. The method of claim 10, wherein the operating frequency of the inverter is approximately 320 kHz.

* * * * *